United States Patent
Sweeting et al.

(10) Patent No.: US 8,566,213 B2
(45) Date of Patent: Oct. 22, 2013

(54) SYSTEM AND METHOD FOR AUTOMATICALLY DISTRIBUTING A TRADING ORDER OVER A RANGE OF PRICES

(75) Inventors: Michael Sweeting, Aldershot (GB); Dinesh Kerai, Middlesex (GB); Nigel John Renton, London (GB); Anthony Paul Seeto, London (GB)

(73) Assignee: BGC Partners, Inc., New York, NY (US)

( * ) Notice: Subject to any disclaimer, the term of this patent is extended or adjusted under 35 U.S.C. 154(b) by 1435 days.

(21) Appl. No.: 11/133,767

(22) Filed: May 20, 2005

(65) Prior Publication Data
US 2006/0265309 A1 Nov. 23, 2006

(51) Int. Cl.
G06Q 40/00 (2012.01)

(52) U.S. Cl.
USPC .......................................................... 705/37

(58) Field of Classification Search
USPC ................................................ 705/37, 36, 35
See application file for complete search history.

(56) References Cited

U.S. PATENT DOCUMENTS

| | | | |
|---|---|---|---|
| 5,845,266 A | 12/1998 | Lupien et al. | |
| 5,950,177 A | 9/1999 | Lupien et al. | |
| 5,963,923 A | 10/1999 | Garber | 705/37 |
| 5,963,932 A | 10/1999 | Garber | |
| 6,098,051 A | 8/2000 | Lupien et al. | |
| 6,134,535 A | 10/2000 | Belzberg | |
| 6,282,521 B1 | 8/2001 | Howorka | |
| 6,343,278 B1 | 1/2002 | Jain et al. | |
| 6,377,940 B2 | 4/2002 | Tilfors et al. | |
| 6,938,011 B1 * | 8/2005 | Kemp et al. | 705/37 |
| 6,952,683 B1 | 10/2005 | Gerhard | |
| 7,047,218 B1 | 5/2006 | Wallman | |
| 7,127,424 B2 | 10/2006 | Kemp, II et al. | |
| 7,136,834 B1 | 11/2006 | Merrin et al. | |
| 7,155,410 B1 | 12/2006 | Woodmansey et al. | |
| 7,308,428 B1 | 12/2007 | Federspiel | |
| 7,356,500 B1 | 4/2008 | Waelbroeck | |
| 7,392,214 B1 | 6/2008 | Fraser et al. | |
| 7,428,506 B2 | 9/2008 | Waelbroeck | |
| 7,533,052 B2 * | 5/2009 | Tilfors et al. | 705/37 |
| 7,565,313 B2 | 7/2009 | Waelbroeck | |

(Continued)

FOREIGN PATENT DOCUMENTS

| | | |
|---|---|---|
| JP | H11-504455 | 4/1999 |
| JP | 2004-046884 | 2/2004 |

(Continued)

OTHER PUBLICATIONS

Notification Authority for International Application No. PCT/US06/19640; 6 pages, Nov. 13, 2007.

(Continued)

*Primary Examiner* — Siegfried E. Chencinski (57) ABSTRACT

According to one embodiment, a method of managing trading is provided. A trading order intended for a trading exchange is received from a trader, the trading order having an associated trading order price. A group of distributed trading orders is automatically generated based at least on the trading order price and a set of pre-configured distribution parameters associated with the trading order. The group of distributed trading orders is distributed over a multiple price levels. The generated group of distributed trading orders is automatically submitted to the trading exchange.

39 Claims, 3 Drawing Sheets

(56) References Cited

U.S. PATENT DOCUMENTS

| | | |
|---|---|---|
| 7,680,715 B2 | 3/2010 | Waelbroeck |
| 7,685,052 B2 | 3/2010 | Waelbroeck |
| 7,747,515 B1 | 6/2010 | Merrin et al. |
| 7,778,919 B2 | 8/2010 | Waelbroeck |
| 7,814,000 B2 | 10/2010 | Waelbroeck |
| 7,827,089 B2 | 11/2010 | Sweeting et al. |
| 7,865,425 B2 | 1/2011 | Waelbroeck |
| 7,870,059 B2 | 1/2011 | Waelbroeck |
| 7,870,062 B2 | 1/2011 | Waelbroeck |
| 7,877,318 B2 | 1/2011 | Waelbroeck |
| 7,882,013 B2 | 2/2011 | Shapiro |
| 7,882,014 B2 | 2/2011 | Shapiro |
| 7,882,015 B2 | 2/2011 | Waelbroeck |
| 7,904,376 B2 | 3/2011 | Shapiro |
| 7,908,203 B2 | 3/2011 | Shapiro |
| 7,908,205 B2 | 3/2011 | Waelbroeck |
| 7,908,206 B2 | 3/2011 | Waelbroeck |
| 7,917,425 B2 | 3/2011 | Waelbroeck |
| 7,996,261 B1 | 8/2011 | Waelbroeck |
| 8,010,438 B2 | 8/2011 | Waelbroeck |
| 8,024,253 B2 | 9/2011 | Peterffy et al. |
| 8,041,628 B2 | 10/2011 | Waelbroeck |
| 8,069,106 B2 | 11/2011 | Waelbroeck |
| 8,095,455 B2 | 1/2012 | Shapiro |
| 8,095,456 B2 | 1/2012 | Shapiro |
| 8,103,579 B1 | 1/2012 | Berkeley |
| 8,108,299 B1 | 1/2012 | Shapiro |
| 8,165,954 B2 | 4/2012 | Waelbroeck et al. |
| 8,266,045 B2 | 9/2012 | Waelbroeck et al. |
| 8,306,904 B1 | 11/2012 | Marchini |
| 2002/0095364 A1* | 7/2002 | Russell et al. .................. 705/37 |
| 2002/0099642 A1 | 7/2002 | Schwankl et al. |
| 2002/0143689 A1 | 10/2002 | Naylor et al. |
| 2002/0169703 A1 | 11/2002 | Lutnick et al. |
| 2003/0154157 A1 | 8/2003 | Kokis et al. |
| 2004/0034591 A1* | 2/2004 | Waelbroeck et al. ........... 705/37 |
| 2004/0143539 A1 | 7/2004 | Penney et al. |
| 2004/0177025 A1 | 9/2004 | Spoonhower et al. |
| 2004/0215549 A1 | 10/2004 | Madhavan et al. |
| 2005/0027638 A1 | 2/2005 | Ng et al. |
| 2005/0187854 A1* | 8/2005 | Cutler et al. .................... 705/37 |
| 2006/0229970 A1 | 10/2006 | Anderson et al. |
| 2006/0259414 A1 | 11/2006 | Singer et al. |
| 2008/0262957 A1 | 10/2008 | Ford |
| 2009/0018945 A1 | 1/2009 | Ford |
| 2009/0089199 A1 | 4/2009 | Waelbroeck |
| 2009/0094151 A1 | 4/2009 | Mortimer |
| 2009/0259584 A1 | 10/2009 | Waelbroeck |
| 2010/0017323 A1 | 1/2010 | Zimmerman |
| 2010/0094775 A1 | 4/2010 | Waelbroeck |
| 2010/0121759 A1 | 5/2010 | Waelbroeck |
| 2010/0122175 A1 | 5/2010 | Waelbroeck |
| 2010/0153304 A1 | 6/2010 | Waelbroeck et al. |
| 2012/0011051 A1 | 1/2012 | Waelbroeck |
| 2012/0095901 A1 | 4/2012 | Berkeley, III |

FOREIGN PATENT DOCUMENTS

| | | |
|---|---|---|
| JP | 2004-535007 | 11/2004 |
| JP | 2004-537769 | 12/2004 |
| JP | 2005-32049 | 2/2005 |
| WO | WO96/34357 | 10/1996 |
| WO | WO 02/29686 A1 | 4/2002 |
| WO | 02/093326 A2 | 11/2002 |

OTHER PUBLICATIONS

JP Office Action for Application No. 2008-512581 dated Nov. 8, 2011; 4 pages (including English Translation).

AU Examination Report for Application No. 2006251674 dated Feb. 9, 2011; 2 pages.

EP Extended Search Report for Application No. 06760245.8 dated Oct. 30, 2009; 7 pages.

US PTO Office action for U.S. Appl. No. 12/477,523; Sep. 22, 2011; 6 pages.

US PTO Office action for U.S. Appl. No. 12/477,549, filed Sep. 22, 2011; 6 pages.

US PTO Office action for U.S. Appl. No. 12/477,523; Jun. 4, 2012; 9 pages.

Notice of Allowance for U.S. Appl. No. 12/477,549; Apr. 17, 2012; 21 pages.

Search Report and Written Opinion for PCT/US06/19640; 6 pages; Nov. 13, 2007.

Notice of Allowance and Examiner Interview Summary Record for U.S. Appl. No. 12/477,549; Aug. 14, 2012; 18 pages.

US PTO Office Action for U.S. Appl. No. 13/234,147; Oct. 1, 2012; 9 pages.

EP Examination Report for Application No. 06760245.8 dated Feb. 13, 2012; 4 pages.

JP Office Action for Application No. 2008-512581 dated Sep. 19, 2012; 6 pages (including English Translation).

US Notice of Allowance for U.S. Appl. No. 13/330,018 dated Apr. 16, 2013; 13 pages.

JP Notice of Allowance for JP Application No. 2008-512581 dated May 2, 2013; 4 pages.

EP summons to Attend Oral Hearings for Application No. 06760245.8 dated Mar. 20, 2013; 7 pages.

* cited by examiner

SYSTEM AND METHOD FOR AUTOMATICALLY DISTRIBUTING A TRADING ORDER OVER A RANGE OF PRICES

TECHNICAL FIELD OF THE INVENTION

This invention relates in general to trading markets and, more particularly, to a system and method for automatically distributing a trading order over a range of prices.

BACKGROUND OF THE INVENTION

In recent years, electronic trading systems have gained a widespread acceptance for trading items. For example, electronic trading systems have been created which facilitate the trading of financial instruments such as stocks, bonds, currency, futures, or other suitable financial instruments.

In some marketplaces, electronic trading is so prevalent that much occurs between computers without human interaction. The market for Foreign Exchange ("FX") of currencies is one example of such a marketplace, whereby currencies for "spot" exchange (i.e., settlement in two business days time) may trade between computers around the globe 24 hours a day. In the foreign exchange spot ("FX Spot") market, some trading system hosts or providers ("trading systems") operate as "name give-up" systems whereby market counterparties to a trade are revealed to each other at the time of that trade. In some other markets, the trading system provider may act as a clearing counterparty, or have a relationship with a central clearing counterparty, such that trades may to be matched without counterparty names being revealed. In name give up markets, when a trading system trades with a market maker order, the trading system, or even the market maker computer system, may hold back acceptance of such a trade until it can check the name of the opposing counterparty to ensure credit is available for the trade. In markets in which a clearing counterparty has been facilitated, a market maker computer system may also hold back acceptance until it has internally checked the foreign exchange rate or price upon which it is being requested to trade.

A market maker (for example a large bank in the FX Spot market) may supply price feeds (e.g., bid-offer spreads) to multiple trading systems to allow them to flood the general marketplace with the market maker's best bid and offer price. Market makers typically generate revenue from sheer volume of trades executed on their prices, by persistently trading at their bid and offer prices and making the difference as profit. This strategy may be referred to as "trading the bid-offer spread." The success of such a strategy relies on, among other things, trading repeatedly and at great frequency, and may also depend upon keeping long or short positions in any one currency to a minimum. Thus, a market maker may need to ensure its price feed is provided to as many trading systems as possible in which FX Spot liquidity and regular trading are present.

The strategy of "trading the spread" can be risky when markets move quickly. A market maker may acquire a large position long or short and be unable to unwind such position during a market move, creating a loss. In this environment, considering that the market maker may have its bid-offer price on many trading systems, it is important for the market maker to be protected against latency in any of those trading systems, at the same time limiting their risk. To guard against becoming overly long or short in any one currency at a disadvantageous price due to latency, a market maker may require the trading systems with which it trades to request a trade authorization or confirmation from the market maker's computer "price feed," rather than deliver a trade confirmation to the trading system as a fait accompli. Thus, there is a difference between (a) a market maker giving a trading system a price, until cancelled, upon which the trading system can trade, and (b) the trading system acquiring the same price from a market maker's "price feed," but needing to request trade conformations from the market maker to confirm that the price feed has not changed. The latter system may be described as the trading system acquiring bid and offer prices from the market maker price feed on a "not held" basis. Such system may afford the market maker some protection against trading system latency, and also against a plurality of trading systems all trying to trade on the same market maker bid or offer simultaneously. In a fast moving market, such protections may be of particularly important. Where trading systems acquire bid and offer prices on a such a "not held" basis from a market maker price feed, they may choose to hold up confirmation of trade executions until the market maker has accepted them. In addition, in some cases, where the trading system has a central clearing counterparty, the trading system operator may take a resulting position on themselves, with an exceptions procedure to neutralize such trading positions.

Many trading systems facilitate the display of limit bids and offers, i.e., bids and offers at less aggressive prices than the bid(s) and offer(s) currently at the best price (or "touch price"). It is often preferable for a market maker to take advantage of such facility to increase the depth of the bids and offers it allows such trading systems to display on their behalf. The market maker's computer system may generate a series of bids and offers such that in a fast moving market they may trade at different levels in quick succession, as opposed to the market maker trading at the best ("touch") price first and then needing to recalculate a new (e.g., slightly worse) price each time before trading again, which may possibly result in declining trades from other trading systems during such recalculation, particularly in fast moving markets, such as the Foreign Exchange market. Also, by using a series of limit bids and offers a market maker may be able to show more size to a trading system but also decrease its risk profile from avoiding showing all of its bid and offer size at only the touch bid/offer prices. Increased size at the touch price may attract other traders to a trading system, but in a suddenly fast moving market it may expose the market maker or the trading system to an undesirable level of risk of being "picked off" by other better informed traders in the market place. In a slow moving market, a market maker may have their price distributed to as many markets as possible with the goal of being the best available bid and/or offer, thus resulting in higher trade volume. In a fast moving volatile market, such a strategy may often result in revenue losses. One dilemma a market maker faces is to both support the trading systems with bid and offers price in as much size as possible, but to not be traded upon simultaneously by too many of those trading systems in a suddenly fast moving market at prices that rapidly become disadvantageous to the market maker.

Where a market maker chooses to make prices available using a price feed as discussed above, it is typically important for all forms of systems latency to be minimized. The speed with which a market maker's computer systems can process trades may dictate the amount of trades it can accept over a short period of time, and ultimately may limit the number of trading systems the market maker may be able to allow their bid and offer prices to be used by. In addition, the speed with which a trading system can make a trade confirmation request to the market maker price feed computer may determine whether that trade is actually executed. In a fast moving market, a delay of only a few hundred milliseconds by the trading system may result in the denial of a trade confirmation request by the market maker price feed computer. Network transmission speed may often be a significant factor of the time taken to get a trade or trade request from a trading system to a market maker's system, and when dealing in milliseconds, the geographical domicile of each computer system may create a network delay that is costly to minimize through higher bandwidth or faster computer networking equipment. Thus, any reduction in processing time for trading is advantageous. Often, with multiple trading systems all accessing the same market maker price feed computer, only the fastest trading system or Systems succeed.

SUMMARY OF THE INVENTION

In accordance with the present invention, systems and methods for automatically distributing a trading order over a range of price levels are provided.

According to one embodiment, a method of managing electronic trading is provided. A trading order intended for a trading exchange is received from a trader, the trading order having an associated trading order price. A group of distributed trading orders is automatically generated based at least on the trading order price and a set of pre-configured distribution parameters associated with the trading order. The group of distributed trading orders may be distributed over multiple price levels. The generated group of distributed trading orders is automatically submitted to the trading exchange.

According to another embodiment, another method of managing electronic trading is provided. A set of distribution parameters are maintained for automatically generating, for a trading order received from a trader for a particular instrument, a group of distributed trading orders to be placed on a trading exchange. A trader is provided an interface for configuring at least a portion of the distribution parameters. In response to input received from the trader, the set of distribution parameters is modified, which may include one or more particular distribution parameters being modified. A particular trading order for the particular instrument is received from the trader, the trading order being defined by one or more trading order parameters. A group of distributed trading orders may be automatically generated based at least on the trading order parameters and the set of distribution parameters modified by the trader. The generated group of distributed trading orders may be automatically submitted to the trading exchange.

According to yet another embodiment, a system for managing electronic trading is provided. The system includes a trading platform operable to manage a trading exchange, and an order distribution application communicatively coupled to the trading platform. The order distribution application may be operable to receive from a particular trader a trading order intended for a trading exchange, the trading order having an associated trading order price for a particular instrument. The order distribution application may further be operable to identify, from a plurality of sets of pre-configured distribution parameters, a particular set of distribution parameters for processing the trading order. The order distribution application may further be operable to automatically generate a group of distributed trading orders distributed over multiple price levels based at least on the trading order price and the identified set of distribution parameters associated with the trading order. The order distribution application may further be operable to automatically submit the generated group of distributed trading orders to the trading exchange.

Various embodiments of the present invention may benefit from numerous advantages. It should be noted that one or more embodiments may benefit from some, none, or all of the advantages discussed below.

One advantage of certain embodiments of the invention is that systems and methods are provided that technically reduce the volume of messages communicated over a network between various entities involved in a trading session. Trading systems that allow limit orders behind (worse than) the touch price may accept distinct order messages for each order at each price level. The present invention as disclosed allows for a customer (or trader) of a trading system (such as a market maker or other type of trader) to pre-configure parameters for the automatic distribution of an order submitted by the trader into multiple orders over a range of prices related to the touch price of the submitted order. The trader may send or make available to a trading system at least one of a bid or offer price and at least one of a bid or offer size, and any other parameters necessary to list a bid or offer on the trading system, which may change throughout a trading session according to market conditions. Instead of sending or making available a series of such bid or offer prices and sizes at different price levels, the trader may pre-configure an application to distribute the size of a submitted bid or offer size for display at different prices on the trading system. As the system that distributes the size of a submitted bid or offer size for display at different prices on the trading system may reside close to or even within the same computer system as the trading system, this may technically reduce the amount of messages communicated over the network from the customer (or trader) systems to the trading system through the trading session, while still maximizing the liquidity made available to the trading system at different price levels.

In some embodiments, the application for pre-configuring price levels behind the touch price to be used for distributing a bid or offer submitted by a trader may be made available for an operator at the trader to use via any suitable communications network, such as the Internet, a virtual private network, or other private network, for example. In some embodiments, the application may also be made available via an Applications Program Interface ("API") for another system application to configure, or another computer to configure automatically according to any one of a number of external influences and market events or conditions.

In addition, in some embodiments, in order to protect the trader against adverse market movements, where a series of trader orders are traded by the trading system, any subsequent regeneration of bid or offer size by the trader to replace size traded may be performed via the pre-configuring application to repopulate prices in order of price level, starting with less aggressive (worse) price levels and moving toward more aggressive price levels.

Another advantage is that the invention as disclosed allows a trader, such as a market maker or other type of trader, to efficiently populate a trading system with bids and offers in a risk efficient manner. In addition, the present invention may allow a trader to weight their risk on the buy side or sell side of a market. For example, if a market maker price feed computer creates too much of a long or short position in its attempt for increased trading at its own bid and offer, the operator may reduce or increase the sizes displayed by the system without adjusting the touch bid/offer price it is producing. In some situations, such reduction or increase of displayed sizes may be done automatically by the trader's systems.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 4 of the drawings, in which like numerals refer to like parts.

In general, systems and methods are provided for automatically placing onto a trading exchange a series of trading orders (e.g., bids and/or offers) distributed over a range of prices for a tradable instrument. Such price-distributed trading orders may be placed on the trading exchange on behalf of a trader, such as a market maker or other trading entity. The distribution of trading orders (hereinafter referred to as "orders") over a range of prices may include a distribution of orders over a range of one or more prices behind (i.e., worse than) the price submitted (or made available) by the trader, which submitted price may represent the current best price that the trader is willing to submit, and may also approximate the current best, or "touch," price for the instrument in the marketplace in general. Thus, when a trader submits (or makes available) a price for an order, the system may automatically place multiple orders for the trader over a range of prices including the submitted price and one or more prices behind the submitted price.

In situations in which the trader submits or makes available a bid-offer price spread (such as where the trader is a market maker, for instance), the system may automatically place multiple bid orders and multiple offer orders for the trader over a range of bid prices and a range of offer prices. More particularly, the system may automatically place multiple bid orders over a range of prices behind (and including) the bid price of the submitted bid-offer spread and multiple offer orders over a range of prices behind (and including) the offer price of the submitted bid-offer spread.

Thus, rather than send a series of bids and offers, which may be relatively time consuming and tedious, a trader can submit or make available a single touch bid and/or offer price, and allow the system to fill out the order book behind such touch bid and/or offer prices according to preconfigured settings for distributing that trader's orders.

In some embodiments, the trader is provided an interface allowing the trader to pre-configure the parameters for distributing its orders at worse prices around touch prices submitted or made available to the trading system by the trader. As used herein, a "worse price" may refer to a worse less aggressive price for the trader, and thus economically worse for any other contra trader matching them: for example, for a foreign exchange Euro versus US Dollar a bid price numerically lower, or an offer price numerically higher, is a worse price.

For example, the trader may send or make available to a trading exchange at least one of a bid or offer price and at least one of a bid or offer size, and any other parameters necessary to list a bid or offer on the exchange, which will change throughout a trading session according to market conditions. Instead of sending or making available a series of such bid or offer prices and sizes at different price levels (e.g., in order to manage the trader's risk profile, from sending or making available such orders), the trader may use the interface to pre-configure a computer application to distribute bids and/or offer sizes submitted by the trader at a single bid and/or offer price for display over a range of prices on the exchange. Such system provides the technical advantage of reducing the volume of network messages being communicated during the trading session, while maximizing (or at least increasing) the liquidity made available to the trading exchange at different price levels. In addition, such systems allow the trader to better manage its risk, as discussed in greater detail below.

Figure 1:
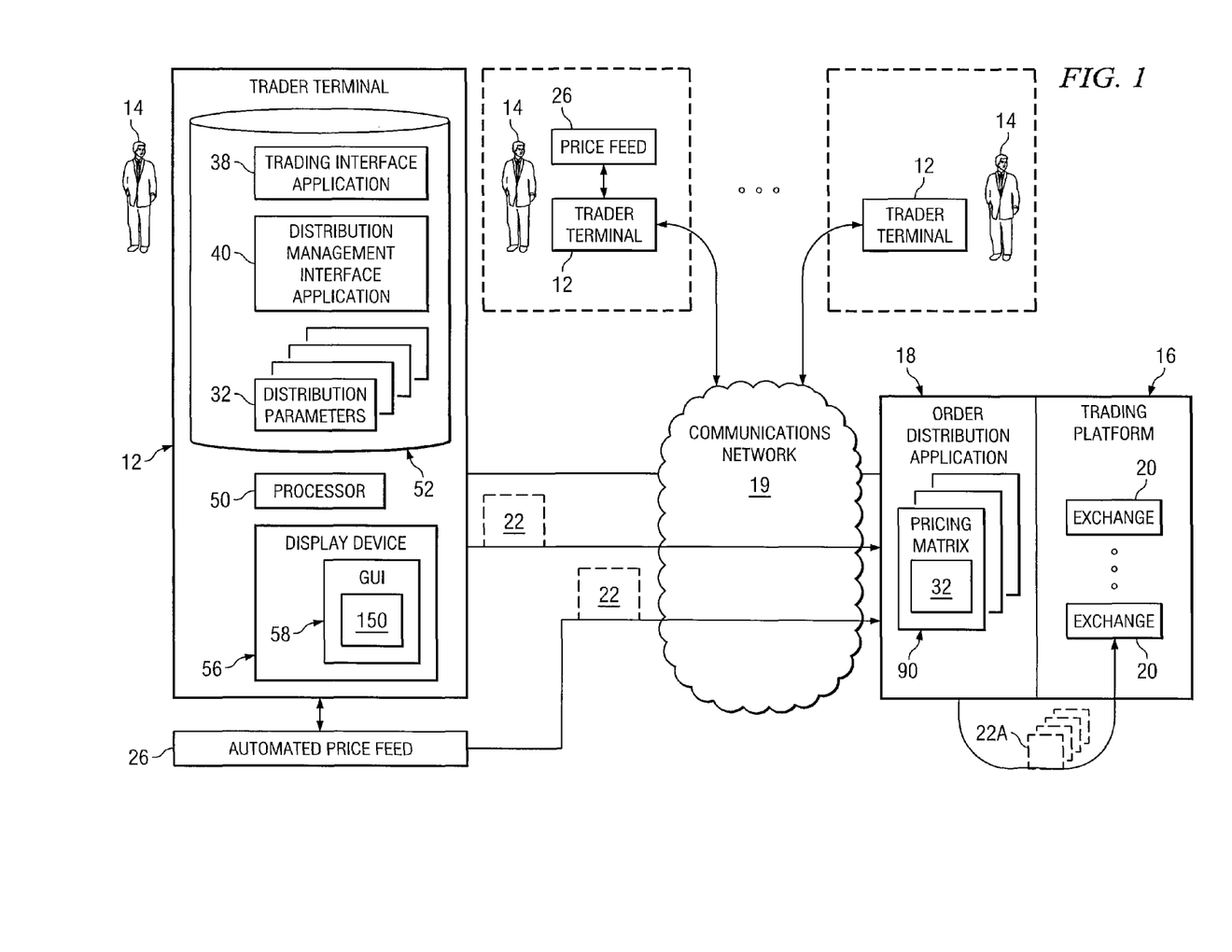
FIG. 1 illustrates an example trading system 10 for automatically distributing trading orders across a range of price levels, according to an embodiment of the present invention.

FIG. 1 illustrates an example trading system 10 for automatically distributing trading orders across a range of price levels, according to an embodiment of the present invention. As shown, system 10 may include one or more trader terminals 12 each associated with one or more trading entities 14, a trading platform 16, and an order distribution application 18. Some or all of the components may be communicatively coupled to each other by a communications network 19. Trading platform 16 may provide and/or manage one or more electronic trading exchanges 20 for various types of tradable instruments, such as currencies, stocks, bonds, futures, options, commodities, derivatives, metals, pollution credits, and/or bandwidth, for example. A trading entity 14 (hereinafter referred to as a "trader 14") may include any entity, such as an individual, group of individuals or firm, that engages in trading activity via trading platform 16. For example, a trader 14 may be an individual investor, a group of investors, a firm (e.g., a brokerage or bank), an institutional investor, a hedger, a speculator, a market maker (i.e., an individual or firm that submits and/or maintains both bid and ask orders simultaneously for the same instrument), or any other entity that may participate in trading in an electronic market. Where trader 14 refers to a non-human entity or a group of people, reference to a trader 14 herein should be understood to include any person or group of people associated with that trader 14.

Traders 14 may submit orders 22 to one or more trading exchanges 20 provided and/or managed by trading platform 16 to trade instruments, such as those listed above, for example. In some embodiments, orders 22 may include any one or more other suitable type of orders, such as limit orders, market orders, stop loss orders, day orders, open orders, GTC ("good till cancelled") orders, "good through" orders, an "all or none" orders, or "any part" orders, for example and not by way of limitation. Generally, orders may include bids and offers for a particular tradable instrument. In addition, as discussed below, an "order 22" may include both (a) prices submitted by a trader 14 upon which the trader 14 is obligated to uphold, such as when a trader 14 submits a typical bid or offer order, and (b) prices made available to a trading exchange 20 by a trader 14, but which the trader 14 is not necessarily obligated to uphold, such as price feeds made available to the trading exchange 20 by the trader 14, for instance. In the latter arrangement, when the trading exchange 20 wishes to execute a trade between a bid or offer from a price feed received from the trader 14 and a bid or offer from a counterparty, the trading exchange 20 (or some third party) may be required to obtain confirmation from the trader 14 before executing the trade. As used herein, an order 22 "submitted by" a trader 14 may include an order being actively submitted by the trader 14, actively or passively submitted on behalf of the trader 14, or otherwise submitted in association with the trader 14.

Traders 14 may submit trading orders 22 to be placed on a trading exchange 20 in any suitable manner. For example, in some embodiments or situations, traders 14 may submit trading orders 22 via a trader terminal 12. A trader may interface with a trader terminal 12 in order to input the desired parameters for the order 22, such as type, bid price, offer price, and/or size, and electronically submit the order 22 using trader terminal 12.

In other embodiments or situations, a trader 14 may submit orders 22 by generating and/or communicating one or more order price feeds 26. An order price feed 26 may be a real time (or substantially real time) stream indicating the current best bid and/or offer a trader is willing to send or make available for an instrument. As a particular example, a market maker (e.g., a bank in a foreign exchange spot market) may supply price feeds (e.g., bid-offer spreads) to multiple trading exchanges 20 and/or trading platforms 16 to allow the market maker to flood the general marketplace with its best bid and offer price. The market makers generates revenue by sheer volume of trades executed on its prices, by persistently trading at its bid and offer prices and profiting the difference, which strategy may be referred to as "trading the bid-offer spread."

An order price feed 26 may be generated based on an analysis of market data from one or more markets for the particular tradable instrument. Such market data may be received, and such analysis may be performed to determine the appropriate price(s) to be communicated via order price feed 26, in real time or substantially in real time (e.g. limited by delays inherent in the electronic communication and analysis of the data). Order price feed 26 may be communicated from any suitable computer system associated with the trader 14, such as trader terminal 12, a central server, or any other suitable computer system.

In order to guard against trading with an unsuitable counterparty, or accepting a trade on an old price that is no longer valid, a trader 14 may require the trading exchange 20 to request a trade authorization or confirmation from the trader's order price feed 26 rather than deliver a trade confirmation to the trading exchange 20 as a fait accompli. Such arrangement may be described as the trading exchange 20 acquiring bid and offer prices from the trader's order price feed 26 on a "not held" basis. Such system may afford the market maker some protection against latency in trading platform 16 or communications system 18, and also against a plurality of trading exchange 20 and/or trading platforms 16 all trying to trade on the same order 22 (e.g., bid or offer) simultaneously, which protection may be particularly important in a fast moving market.

Order distribution application 18 is generally operable to generate and place groups of distributed orders 22a onto a trading exchange 20. More particularly, operating as an intermediary between trader 14 and trading platform 16, order distribution application 18 may (a) receive an order 22 from a traders 14 (e.g., via trading terminal 12 and/or price feed 26), (b) automatically generate a group of distributed orders 22a over a range of price levels based on one or more parameters of the received order 22 (e.g., price and size) and appropriate distribution parameters 32, and (c) automatically place the group of distributed orders 22a onto the trading exchange 20. In some embodiments or situations, the distributed orders 22a generated by order distribution application 18 and placed onto the appropriate trading exchange 20 are displayed to the market such that other traders 14 can view the distributed orders 22a. Order distribution application 18 may include any suitable software or other computer instructions suitable to perform the functionality described herein.

Generating a group of distributed orders 22a over a range of price levels may include distributing an order 22 over a range of one or more prices behind (i.e., worse than) and/or including the price of the order 22 submitted by the trader 14, which price may be referred to herein as the "submitted order price." As discussed above, a submitted order price may include, for example, a bid price, an offer price, or a bid-offer spread price. In some embodiments, such as in embodiments in which orders 22 are received via price feeds 26, the "submitted order price" received from trader 14 may also represent or approximate the current best, or "touch," price for the instrument.

Generating a group of distributed orders 22a over a range of price levels may include, for example, (a) distributing the size of a received order 22 over a range of price levels (e.g., including the submitted order price and one or more worse prices), or (b) leaving the submitted order price and size of the received order 22 intact and generating one or more additional orders 22a over a range of one or more price levels behind the submitted order price. Thus, in the former alternative, the total size of the group of distributed orders 22a generated for a received order 22 is equal to that of the received order 22, whereas in the latter alternative, the total size of the group of distributed orders 22a generated for a received order 22 is greater than that of the received order 22.

In situations in which a submitted order 22 is a bid-offer price spread consisting of a bid order and an offer order (such as where the trader is a market maker, for instance), the group of distributed orders 22a generated for the bid-offer price spread may include (a) a number of bid orders 22a distributed over a range of bid prices including the submitted bid price (from the submitted bid-offer price spread) and one or more worse bid prices, and (b) a number of offer orders 22a distributed over a range of bid prices including the submitted offer price (from the submitted bid-offer price spread) and one or more worse offer prices.

As discussed above, order distribution application 18 may generate the group of distributed orders 22a for a received order 22 based at least on (a) one or more parameters of the received order 22, such as the price(s) and size defined by the order, and (b) appropriate distribution parameters 32. Distribution parameters 32 may include any parameters or other data that may be used by order distribution application 18 to distribute a received order 22 into a group of distributed orders 22a to be placed on an appropriate trading exchange 20. For example, such distribution parameters 32 for a particular trader 14 and for a particular instrument may include parameters defining one or more of the following:

(a) the number of price levels over which a received order 22 should be distributed (i.e. the number of distributed orders 22a to generate for a received order 22);

(b) for each price level, the amount offset from the submitted order price (in some cases, the touch price), which amount may be defined in any suitable terms, such as in ticks, basis points in price, basis points in yield, price units, currency units, or fractions of a currency unit, for example;

(c) for each price level, the size of the distributed order 22a to generate for that price level, which may be defined in any suitable terms, such as an absolute size or relative to the size of the received order 22 (e.g., a percentage of the size of the received order 22);

(d) a total liquidity size allowed by the trader 14 (which may include a total bid size and a total offer size, which may or may not be the same size);

(e) default and/or user-selected values or settings for any of parameters (a)-(d); that may enable quick reset to commonly configured values; and (f) multiple values or settings for any of parameters (a)-(e) corresponding to different time zones, such as Asia, London, and US time zones for a foreign exchange market, for example, or to configure different parameters over the publication of any particular economic data release or important event, for example.

Distribution parameters 32 may be configured, stored, and managed for any number of different traders 14, tradable instruments, and trading exchanges 20, and any combination thereof. For example, each trader 14 may have a different set of distribution parameters 32 for each of a variety of instruments, and for each of a variety of trading exchanges. Thus, a particular trader 14 may have a first set of distribution parameters 32 for trading instrument A on exchange A, a second set of distribution parameters 32 for trading instrument A on exchange B, a third set of distribution parameters 32 for trading instrument B on exchange A, and a fourth set of distribution parameters 32 for trading instrument B on exchange B. In some embodiments, distribution parameters 32 may be defined by various pricing matrices 90, such as described below with reference to FIG. 2. Distribution parameters 32 may be stored in any suitable memory device associated with order distribution application 18, such as memory storage in a server or other computer system, for example.

Order distribution application 18 may be separate from, partially integrated with, or fully integrated with trading platform 16. For example, in some embodiments, order distribution application 18 may be hosted by a computer system (such as a server, for example) located physically separate from trading platform 16, communicatively coupled to trading platform 16 by communications network 19 or any similar communication links. In other embodiments, order distribution application 18 may be hosted by the same computer system (such as a server or group of servers, for example) as trading platform 16, in order to maximize the technical effect of increased order processing speed through reduced messaging over communications network 19.

As discussed above, in some embodiments, trader terminals 12 may provide traders 14 access to (a) engage in trading activity via trading platform 16 via a trading interface application 38 and/or (b) configure and/or manage distribution parameters 32 defining the generation of distribution orders 22a via a distribution management interface application 40. A trader terminal 12 may include a computer system including any appropriate hardware and/or software for providing such functionality. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

A trader terminal 12 may include a trading interface application 38 for providing the trader 14 access to engage in trading activity and/or a distribution management interface application 40 to provide the configure and/or manage distribution parameters 32 defining the generation of distribution orders 22a. It should be understood that in certain embodiments, any or all of the functionality described herein as being provided by trading interface application 38 and/or distribution management interface application 40 at trading terminal 12 may alternatively or additionally be performed or provided by any other portion of trading system 10, such as order distribution application 18, trading platform 16, communications network 19, or one or more servers associated with one or more trading terminals 12, such as servers associated with a trading firm (e.g., a brokerage or bank) or other collection of traders 14, for example. Thus, any relevant portion(s) of trading system 10 may include any suitable hardware and/or software appropriate for performing or providing any or all of such functionality.

In addition to trading interface application 38 and/or distribution management interface application 40, trader terminal 12 may include a processor 50 and memory 52. Interface application 38 and/or distribution management interface application 40 may be stored in memory 52. Processing unit 32 may execute applications 38 and/or 40 to provide any or all of the various functions provided by such applications. In some embodiments, memory 52 may also store distribution parameters 32 corresponding to trader 14, which may include particular default parameters and/or particular parameters configured by trader 14. For example, such distribution parameters 32 may be stored as a backup copy (backing up a copy stored in association with order distribution application 18, thus providing a layer of redundancy to the system. In other embodiments, distribution parameters 32, including parameters configured by trader 14, are stored only in association with order distribution application 18). Memory 52 may be coupled processor 52 and may include one or more databases and other suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Trader terminal 12 may also include a display device 56, such as a monitor, screen, panel display, or any other suitable device operable to display information to a trader 14. In certain embodiments, display device 56 may be operable to display a graphical user interface 58, which may be used by distribution management interface application 40 to display various screens for configuring and/or managing distribution parameters 32. Graphical user interface 58 may include any suitable software or other executable code for displaying such information via display device 56. A trader terminal 12 may also include one or more human interface, such as a mouse, keyboard, or pointer, for example, allowing a trader 14 to interface with graphical user interface 58, such as to view, select, or configure various distribution parameters 32, for example.

Communications network 19 is a communicative platform operable to exchange data or information between traders 14 and order distribution application 18 and, in some embodiments, between order distribution application 18 and trading platform 16. Communications network 19 represents an Internet architecture in a particular embodiment of the present invention, which provides traders 14 the ability to electronically submit orders 22 to be delivered to a trading exchange 20 (either directly or via order distribution application 18). In other embodiments, communications system 14 could be any packet data network (PDN) offering a communications interface or exchange between any two nodes in system 10. Communications network 19 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

As discussed above, trading platform 16 may comprise a trading architecture that facilitates the management of one or more electronic trading exchanges 20 for one or more tradable instruments or products. Trading platform 16 may provide access to and/or manage any one or more types of electronic trading exchanges 20, such as one or more currency exchange market (e.g., foreign exchange markets), stock markets, bond markets, futures markets, options markets, commodities markets, metals markets, derivative markets, pollution credits markets, bandwidth markets, and/or any other type or types of electronic markets in which instruments may be traded.

In particular, trading platform 16 may manage or facilitate the trading of one or more types of trading orders 22 for one or more types of instruments. Trading platform 16 may be operable to receive orders 22 from traders 14, place such orders 22 on the appropriate exchange(s) 20, and manage the orders 22 on such exchange(s) 20 such that financial transactions among and between traders 14 may be performed. Trading platform 16 may have a link or a connection to a market trading floor, or some other suitable coupling to any suitable element that allows for such transactions to be consummated.

Trading platform 16 may include one or more computers, servers, a management center, a single workstation, or a headquartering office for any person, business, or entity that seeks to manage the trading of trading orders 22. Accordingly, trading platform 16 may include any suitable hardware, software, personnel, devices, components, elements, or objects that may be utilized or implemented for managing or administering one or more electronic trading exchanges. It should be understood that the functionality provided by trading platform 16 may be at least partially manual such that one or more humans may provide various functionality associated with trading platform 16.

Pricing Matrix/Distribution Parameters

Figure 2:
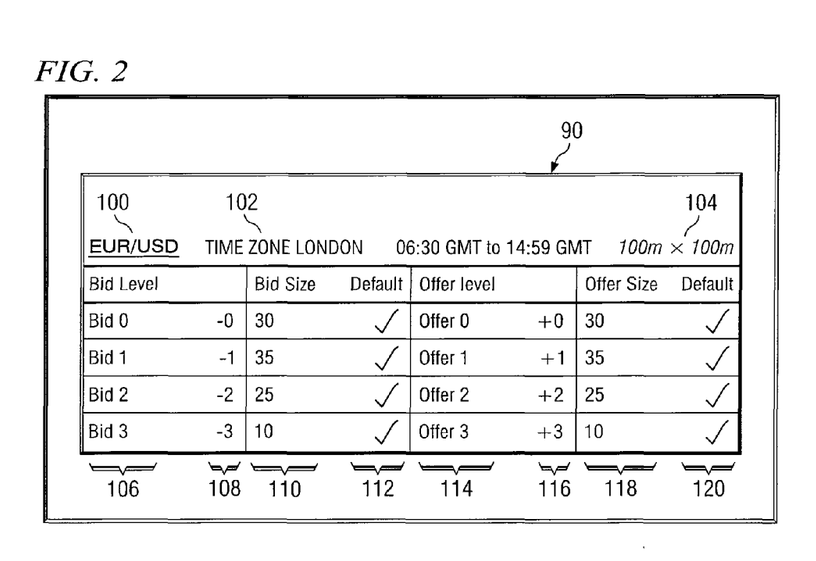
FIG. 2 illustrates an example pricing matrix defining a set of distribution parameters for a particular trader, a particular instrument, and a particular time zone, according to one embodiment of the invention.

FIG. 2 illustrates an example pricing matrix 90 defining a set of distribution parameters 32a for a particular trader 14, a particular instrument, and a particular time zone, according to one embodiment of the invention. Pricing matrix 90 defines the following distribution parameters 32a, as indicated by the following reference numerals:

100: The particular instrument (Euro-$US currency pair).
102: The particular time zone (Time Zone London).
104: The total liquidity size allowed by the trader 14, including the total bid size (100 million) and a total offer size (100 million). This may effectively limit any size that may be sent or made available via trading orders 22.
106: Four bid price levels (Bid 0, Bid 1, Bid 2, Bid 3) for distributing received orders 22.
108: For each of the four bid price levels, a price offset in ticks (−0, −1, −2, −3), defining the price of that level relative to the submitted bid price.
110: For each of the four bid price levels, a Bid Size indicating the size of the distributed bid orders 22a (30 million, 35 million, 25 million, 10 million) to be generated for a received bid order of size 100 million.
112: For each of the four bid price levels, an indication that the price offset and Bid Size for that bid price level (indicated by arrows 108 and 110) are default values.
114: Four offer price levels (Offer 0, Offer 1, Offer 2, Offer 3) for distributing received orders 22.
116: For each of the four offer price levels, a price offset in ticks (+0, +1, +2, +3), defining the price of that level relative to the submitted offer price.
118: For each of the four offer price levels, a Offer Size indicating the size of the distributed offer orders 22a (30 million, 35 million, 25 million, 10 million) to be generated for a received offer order of size 100 million.
120: For each of the four offer price levels, an indication that the price offset and Offer Size for that offer price level (indicated by arrows 116 and 118) are default values.

Distribution parameters 32 may be configured, stored, and/or managed by order distribution application 18. In addition, various distribution parameters 32 may be configured and/or managed by a trader 14 using a distribution management interface application 40, such that the trader 14 may configure its settings as desired, such as in accordance with the available trading size limits that may be set, desired aggressiveness, desired risk level, latency, and/or other characteristics associated with that trader 14. Thus, distribution parameters 32 may be configured completely automatically (e.g., by order distribution application 18), manually by a trader 14 using distribution management interface application 40, or any combination thereof. Distribution management interface application 40 and its associated functionality are discussed in greater detail below with reference to FIG. 3.

Distribution Management Interface Application

Figure 3:
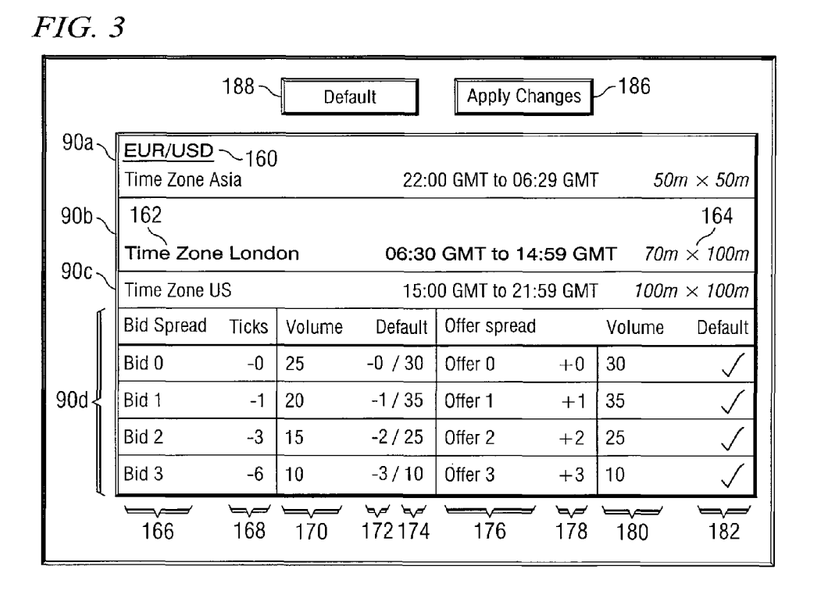
FIG. 3 illustrates an example display of a graphical user interface provided by a distribution management interface application, in accordance with one example of the disclosure.

As discussed above, distribution management interface application 40 may provide a trader 14 a graphical user interface 58 for configuring and/or managing one or more distribution parameters 32 defining the generation of distribution orders 22a for orders 22 submitted by the trader 14. In certain embodiments, a trader 14 may be required to log in to the system in order to access such distribution parameters 32 for viewing and/or configuration. Such login process may be managed by distribution management interface application 40 and/or order distribution application 18, may require the user to enter a login name (e.g., user ID) and password information, and may involve encrypted communications between the relevant hardware and/or software. In addition, in some embodiments, distribution parameters 32 updated from one application login may display on other applications, along with a notification of the login name associated with the last modification.

FIG. 3 illustrates an example display 150 of a graphical user interface 58 provided by distribution management interface application 40, in accordance with one example of the disclosure. A trader 14 may interface with graphical user interface 58 in any suitable manner to configure one or more distribution parameters 32, such as using an computer input device or pointer (e.g., a mouse, keyboard, or touchpad). As discussed above, in some embodiments, distribution management interface application 40 may cooperate with order distribution application 18 to configure, store and/or manage such distribution parameters 32.

Display 150 illustrates three pricing matrices 90a, 90b, and 90c for trader 14 for a particular tradable instrument that may be available, each pricing matrix 90a, 90b and 90c corresponding to a particular time zone (specifically, Time Zone Asia, Time Zone London, and Time Zone US). None, some or all of the settings for the distribution parameters 32, defined by each of the three pricing matrices 90a, 90b, and 90c may be different from those defined by the other two. For reference, each pricing matrix 90a, 90b, and 90c may be similar to pricing matrix 90 discussed above regarding FIG. 2. It should be understood using three pricing matrices 90 (corresponding to time zones) for a particular instrument is merely exemplary. Thus, distribution management interface application 40 (and/or order distribution application 18) may allow trader 14 to configure and/or store other numbers of pricing matrices 90 corresponding to other numbers of time zones.

In the example shown in FIG. 3, trader 14 has selected pricing matrix 90b (for Time Zone London) for viewing and/or configuration. Pricing matrix 90b defines the following distribution parameters 32b, as indicated by the following reference numerals:

- 160: The particular instrument (Euro-$US currency pair).
- 162: The particular time zone (Time Zone London).
- 164: The total liquidity size allowed by the trader 14, including the total bid size (70 million) and a total offer size (100 million). This may effectively limit any size that may be sent or made available via trading orders 22.
- 166: Four bid price levels (Bid 0, Bid 1, Bid 2, Bid 3) for distributing received orders 22.
- 168: For each of the four bid price levels, a trader-selected price offset in ticks (−0, −1, −3, −6), defining the price of that level relative to the submitted bid price.
- 170: For each of the four bid price levels, a trader-selected Bid Volume indicating the size of the distributed orders 22a (25 million, 20 million, 15 million, 10 million) to be generated for a received bid order of size 70 million.
- 172: For each of the four bid price levels, a default price offset in ticks (−0, −1, −2, −3), defining the price of that level relative to the submitted bid price.
- 174: For each of the four bid price levels, a default Bid Volume indicating the size of the distributed bid orders 22a (35 million, 35 million, 25 million, 10 million) to be generated for a default received bid order of size 100 million.
- 176: Four offer price levels (Offer 0, Offer 1, Offer 2, Offer 3) for distributing received orders 22.
- 178: For each of the four offer price levels, a default price offset in ticks (+0, +1, +2, +3), defining the price of that level relative to the submitted offer price.
- 180: For each of the four offer price levels, a default Offer Volume indicating the size of the distributed offer orders 22a (30 million, 35 million, 25 million, 10 million) to be generated for a received offer order of size 100 million.
- 182: For each of the four offer price levels, an indication that the price offset and Offer Size for that offer price level (indicated by arrows 178 and 180) are the default values.

Distribution management interface application 40 may permit trader 14 to configure or modify all or particular ones of such distribution parameters 32b defined by price matrix 90b. For example, a trader 14 may adjust the settings for the total liquidity sizes (164), the price offsets (168, 178), and/or the distributed order sizes (170, 180) defined by price matrix 90b based on the trader's desired aggressiveness, desired risk level, latency, and/or other characteristics associated with that trader 14, in an attempt to maximize trading volume and/or profits for the trader 14.

In some embodiments, display 150 includes an "Apply Changes" button 186 that may be activated (e.g., clicked) by trader 14 in order to make any changes to distribution parameters 32b persist going forward, at least until such distribution parameters 32b are modified again at some later time. If trader 14 modifies one or more distribution parameters 32b for a particular time zone, but fails to activate "Apply Changes" button 186, the modifications may be discarded, such as when the trader 14 logs off or at the expiration of the particular time zone, for example. In some embodiments, clicking on a "Default" button 188 included in display 150 may return the related bid or offer spread and volume numbers to default settings, such as the default settings indicated by arrows 172, 174, 178 and 180.

If trader 14 makes modifications and activates "Apply Changes" button 186, distribution management interface application 40 and/or order distribution application 18 may communicate a "change accepted" notification, which may be displayed to trader 14 in any suitable manner, such as via graphical user interface 58 or via email, for example. In some embodiments, modifications to distribution parameters 32b may be communicated to order distribution application 18, which may store a copy of such distribution parameters 32b used by order distribution application 18 for generating distributed orders 22a, as discussed above. In addition, distribution management interface application 40 and/or order distribution application 18 may keep a log of parameter modifications made by trader 14. Such log may be kept for a particular time period, such as the last five days, for example, such that the modification data may be recalled for any suitable reason, such as an audit of parameter modifications.

In addition, in some embodiments, distribution management interface application 40 may allow the trader 14 to configure various aspects of display 150, such as which data are included in display 150 and/or the particular arrangement of such data included in display 150, as desired by the trader 14. Distribution management interface application 40 may allow the trader 14 to save and retain such display settings for future logins by trader 14.

Also, in some embodiments, distribution management interface application 40 may be available to multiple traders 14 such that multiple access to configure various aspects of display 150 is facilitated. A log of these adjustments may be stored, for example, to allow New York based trader to see what adjustments were made at what time by a London based trader.

Displaying and Regenerating Order Volume

The group of distributed orders 22a generated by order distribution application 18 and placed onto the appropriate trading exchange 20 may be displayed to trader 14, such as via graphical user interface 58, and/or to the market in general such that other traders 14 can view (and thus trade on) the group of distributed orders 22a.

In one example embodiment, for a Euro versus US Dollar (€/$) bid-offer spread of 1.2410-1.2412 submitted by a trader 14 (e.g., via a bid-offer price feed), such display may appear as follows:

| EUR/USD bid-offer price feed: 1.2410–1.241 70 m × 100 m | | | |
|---|---|---|---|
| Bid price | Bid Volume | Offer price | Offer Volume |
| 1.2410 | 25 | 1.2412 | 30 |
| 1.2409 | 20 | 1.2413 | 35 |
| 1.2407 | 15 | 1.2414 | 25 |
| 1.2404 | 10 | 1.2415 | 10 |

In this example display, the total volume of bids and offers submitted by the trader 14, which may be referred to as the "total sourced liquidity size," is indicated along the top line. Here, the total sourced bid liquidity size is 70 million, and the total sourced offer liquidity size is 100 million.

In certain embodiments, order distribution application 18 may define various rules governing the filing and "regeneration" of orders 22 submitted by a trader 14 (via a price feed or otherwise) after successful trades are executed. For example, in some embodiments, where the total sourced bid or offer liquidity size is less than the total volume stipulated by the relevant pricing matrix 90b (e.g., as indicated by arrows 104 and 164 in the examples shown in FIGS. 2 and 3), the volume of bids or offers is truncated in order across the price levels, beginning with the highest (i.e., best) tier and moving downward. Alternatively, where the total sourced bid or offer liquidity size is more than the total volume stipulated by the relevant pricing matrix 90, the volume of bids or offers is truncated in order across the price levels, beginning with the lowest (i.e., worst) tier and moving upward.

For example, using the example bid-offer display shown above, after a series of bids was hit for a size of 30 m, the display may appear as follows:

| EUR/USD API price 1.2410–1.2412 35 m × 100 m | | | |
|---|---|---|---|
| 1.2410 | 25 | 1.2412 | 30 |
| 1.2409 | 15 | 1.2413 | 35 |
| 1.2407 | 15 | 1.2414 | 25 |
| 1.2404 | 10 | 1.2415 | 10 | wherein the trade is executed against the bid price levels in order, beginning with the highest price level and moving downward. Thus, the 25 m top bid level is completely removed, as indicated by the italics, and the remaining 5 m (of the 30 m traded) is removed from the next highest bid price level, thus reducing the volume at that level from 20 m to 15 m, as the liquidity offered by the trader 14 fails to completely fill the sizes at each price level.

In addition, in some embodiments, even if the sourced bid price is changed, each distributed price level defined by the relevant pricing matrix will be filled in a "bottom-up" fashion, beginning with the lowest (i.e., worst) bid price level. Thus, if the sourced bid liquidity size is insufficient to fill all of the price levels defined by the relevant pricing matrix, the top level(s) may not be populated at all, in which case the submitted best bid-offer spread is effectively widened.

As an trader 14 "regenerates" to trade more volume after a trade on one or more of its distributed orders 22a, the regenerated size may be incrementally added to the trade or subsequent bid-offer state on the trader's behalf such that it replaces sizes just traded at each price level, beginning with the lower (i.e., worst) price levels and working upwards. As used herein, the term "regeneration" means incrementally increasing size on a trading order 22 to subsequently replace size traded after trades upon distributed trading orders 22a.

For example, suppose a pricing matrix which defines the following distribution parameters 32:

| Total Bid volume = 100 m | | |
|---|---|---|
| Bid price level | Price offset | Bid volume |
| Bid0 | –0 | 25 |
| Bid1 | –1 | 20 |
| Bid2 | –3 | 15 |
| Bid3 | –6 | 40 |

If the trader's bid trading order 20 is in 100 m, and the trader's distributed orders 22a get hit by a 30 m offer or sell order, trading platform 14 hits all 25 m of Bid0, and 5 m of Bid1. The bid size sourced from the trader 14 for trading order 22 would drop from 100 m to 70 m, and the resultant prices showing on the bid would become:

| Bid0 | –0 | 0 |
|---|---|---|
| Bid1 | –1 | 15 |
| Bid2 | –3 | 15 |
| Bid3 | –6 | 40 |

If trader 14 then regenerates for another 1 m (i.e., if the sourced bid size for trading order 22 is increased from the 70 m residual size to 71 m), regardless of price level, order distribution application 18 adds the extra 1 m to the Bid1 price level:

| Bid0 | –0 | 0 |
|---|---|---|
| Bid1 | –1 | 16 |
| Bid2 | –3 | 15 |
| Bid3 | –6 | 40 |

If trader 14 then regenerates for another 5 m (i.e., the sourced bid size for trading order 22 is increased to 76 m), and the submitted bid price (e.g., the bid price defined by the trader's price feed) has not changed, order distribution application 18 fills up the Bid1 price level and advances to begin filling the next highest price level, the Bid0 price level:

| Bid0 | –0 | 1 |
|---|---|---|
| Bid1 | –1 | 20 |
| Bid2 | –3 | 15 |
| Bid3 | –6 | 40 |

In some embodiments, order distribution application 18 may provide this method for regenerating or refilling reduced distributed order volumes for any price source, for both bid-offer spreads and lone bids and offers, and for orders 22 submitted both via price feed and by standard means.

System Operation

Figure 4:
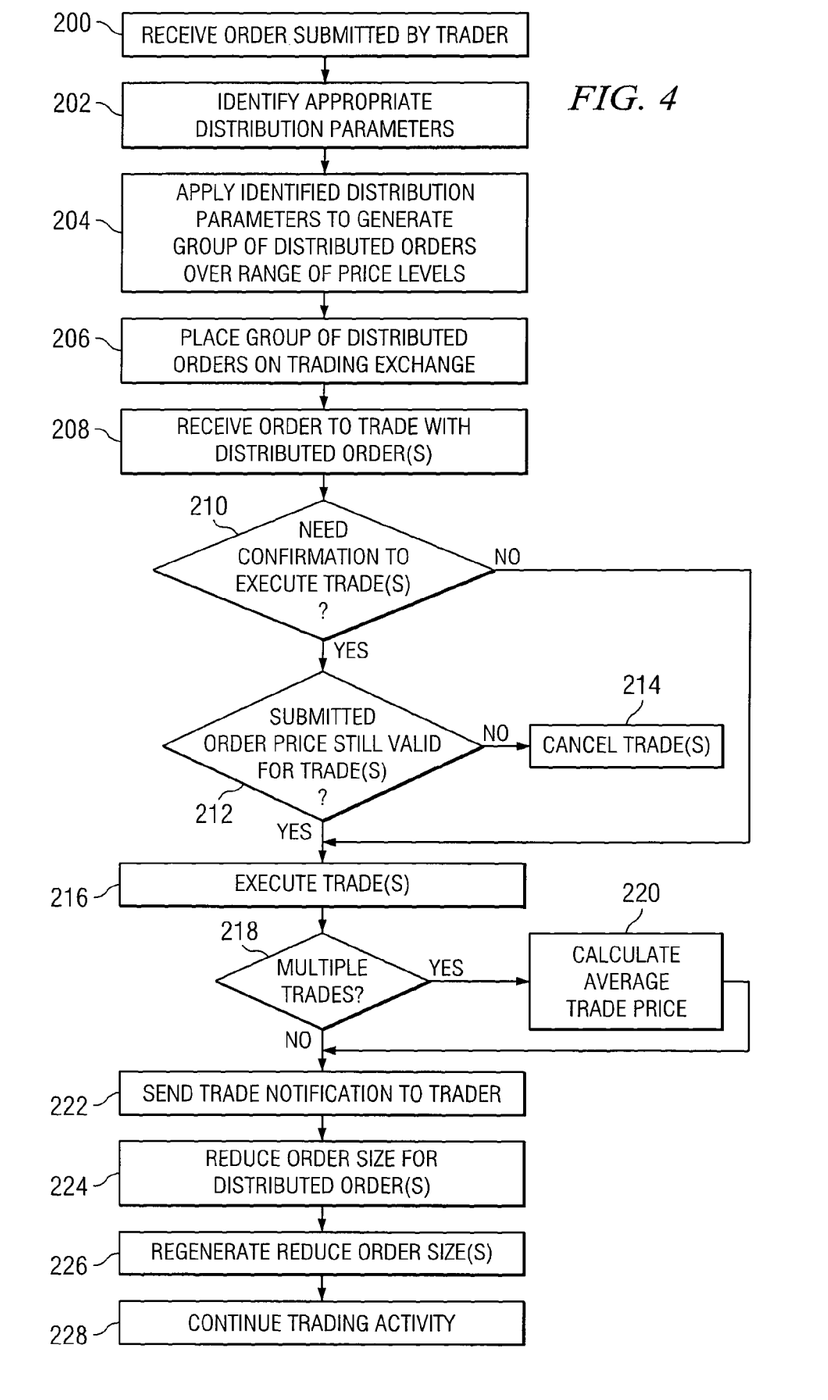
FIG. 4 illustrates an example method of the operation of the system of FIG. 1 for processing and distributing an order submitted by a trader, according to one embodiment of the disclosure.

FIG. 4 illustrates an example method of the operation of system 10 for processing an order 22 submitted by a trader 14, according to one embodiment of the disclosure. At step 200, a particular trader 14 submits an order 22, such as a bid, an offer, or a bid-offer spread for a particular instrument to be placed on one or more trading exchanges 20 managed by trading platform 16. As discussed above, submitting such order 22 may include, for example, (a) trader 14 actively submitting a bid, offer, or bid-offer spread to be traded on and/or (b) trader 14 making a bid price, offer price, or bid-offer price spread available to the trading system, such as via one or more real time (or substantially real time) price feeds 26. Order 22 submitted by trader 14 may be communicated to order distribution application 18 for processing (distribution) and forwarding to the appropriate trading exchange 20.

At step 202, upon receiving the order 22 submitted by trader 14, order distribution application 18 may identify and/or retrieve the appropriate distribution parameters 32 for the order 22 based on various parameters defined by data communicated along with that particular order 22, such as the identity of the particular trader 14, the identify of the particular instrument, and/or the appropriate time zone, for example. In embodiments in which distribution parameters 32 are defined by stored pricing matrices (such as pricing matrices 90 shown in FIG. 2 or 3, for example), order distribution application 18 may identify and/or retrieve from memory the appropriate pricing matrix corresponding to such order parameters.

At step 204, order distribution application 18 may apply the pricing matrix identified at step 202 in order to generate a group of distributed orders 22a to be placed on the appropriate trading exchange 20. For example, supposing the submitted order 22 is a bid-offer spread, and the identified pricing matrix defines five different price levels for distributed bids and five different price levels for distributed offers, along with the price offsets and order size for each of such bid price levels and offer price levels, order distribution application 18 may generate five distributed bid orders 22a and five distributed offer orders 22a. The price and size for each of the five distributed bid orders 22a and five distributed offer orders 22a may be determined as defined by the pricing matrix.

At step 206, order distribution application 18 may then place the group of five distributed bid orders 22a and the group of five distributed offer orders 22a onto the appropriate trading exchange 20.

At step 208, a contra order is received at trading exchange 20 having a price suitable to trade with one or more of the distributed bid orders 22a or distributed offer orders 22a. As used herein, a "contra" order may refer to an order on the other side of the market. Thus, for example, a bid or buy order is a contra order to an offer or sell order, and an offer or sell order is a contra order to a bid or buy order.

In some embodiments, as shown at step 210, if the trader's order 22 was submitted at step 200 as an order upon which the trading exchange 20 can trade without further confirmation or from trader 14 in order to execute trades, the method may skip ahead to step 216 to execute the trade. However, if the order 22 was submitted at step 200 as an order for which the trading exchange 20 needs to obtain additional conformation from trader 14 in order to execute trades, at step 212 order distribution application 18 or trading exchange 20 may attempt to confirm with trader 14 that the trade(s) between the contra order and one or more of the distributed bid orders 22a may be executed. For example, trading exchange 20 may determine whether the price(s) that were submitted by the trader 14 at step 200 are still valid or appropriate for the trade determined at step 208, such as by checking the trader's price feed to determine whether the submitted price is still appropriate for the trade or has moved to a price not appropriate for the trade. If the price is no longer appropriate for the trade trading exchange 20 may cancel the trade(s) at step 214. If the price is still appropriate for the trade, trading exchange 20 may execute one or more trades between the contra order and one or more of the distributed bid orders 22a at step 216. In some situations, if the price of the contra order is appropriate to trade with more than one of the distributed bid orders 22a, and the size of the contra order is larger than the size of the distributed bid order 22a at the best (i.e., most aggressive) price, trading exchange may concurrently (or substantially concurrently) execute multiple trades between the contra order and multiple distributed bid orders 22a. Alternatively, if the size of the contra order is less than or equal to the size of the distributed bid order 22a at the best (i.e., most aggressive) price, trading exchange may execute a single trade between the contra order and that distributed bid order 22a.

As shown at step 218, if a single trade was executed at step 216, the method may skip to step 222. Alternatively, if multiple trades were executed at step 216 between the contra order and multiple distributed bid orders 22a, the method may proceed to step 220. At step 220, order distribution application 18 and/or trading exchange 20 may calculate an average trade price for the multiple trades executed at step 216. Such calculation may be based on the price and traded size of each of the multiple distributed bid orders 22a traded with the contra order. For example, suppose a contra sell order of size 55 m was traded with the following distributed bid orders:

(a) Bid 0, price=1.2410, traded size=25 m
(b) Bid 1, price=1.2409, traded size=15 m
(a) Bid 2, price=1.2407, traded size=15 m The average trade price is [(1.2410)(25 m)+(1.2409)(15 m)+(1.2407)(15 m)]/55 m, which equals 1.240891. The average trade price may be rounded to any suitable or desired number of decimal places.

At step 222, order distribution application 18 and/or trading exchange 20 may communicate an executed trade notification, indicated in FIG. 1 as notification 250, to trader 14 (e.g., to trader terminal 12 for display to trader 14). Notification 250 may indicate various details regarding the one or more trades executed at step 216, such as the time, size and price of the trade(s), and any other suitable information, for example. In some embodiments, where multiple trades were executed at step 216 between the contra order and multiple distributed bid orders 22a, notification 250 may indicate the total size traded and the average trade price for that total size traded, as calculated at step 220. Thus, in some embodiments, a single notification 250 may be communicated to trader 14 for multiple trades, rather than separate notifications for each trade. Thus, since such separate, multiple notifications may be effectively replaced with a single notification 250, the volume of network messaging regarding multiple trades may be significantly reduced.

In some embodiments or situations, the average trade price may be calculated prior to executing the trades at step 216. For example, the average trade price may be calculated prior to seeking confirmation from trader 14 at step 212 to execute the trade(s). Thus, a single confirmation request/attempt may be communicated at step 212 that includes the calculated average trade price, rather than communicating separate confirmation requests/attempts for each of the multiple distributed orders 22a to be traded with the contra order. Thus, the volume of network messaging regarding multiple trades may be further reduced.

Also in response to the trade being executed at step 216, at step 224, trading exchange 20 may reduce the displayed order sizes for each of the one or more distributed orders 22a that was traded on. In some cases, the sizes for one or more distributed orders 22a are completely removed. In addition, the total sourced liquidity size displayed for the user may be reduced by the total size of the trade.

At step 226, trader 14 may automatically or manually regenerate at least a portion of the reduced total sourced liquidity size. In some embodiments in which the trader provides a continuous price feed, such regeneration may be performed automatically based on the price feed made available for trader 14. In addition, in some embodiments, such regeneration may be managed by order distribution application 18 in a "bottom up" manner, such that lower (i.e., worse) price levels are filled first, such as described above in the "Displaying and Regenerating Order Volume" section. Trading activity may continue at step 228.

Modifications, additions, or omissions may be made to any of the methods discussed above, such as the methods discussed above with reference to FIG. 4, without departing from the scope of the invention. For example, in some embodiments, trading exchange 20 trades on distributed orders 22a without seeking confirmation from traders 14 to execute such trades, even where traders 14 are merely making a price feed available to the market. In such embodiments, the trading exchange 20 may assume the risk of the trader 14 refusing liability for the trade, or have some negotiated arrangement with the trader 14 to distribute the risk. In such embodiments, steps 210-214 regarding the confirming of trades prior to execution may be omitted from the method, or may still be performed to allow the trading exchange to be alerted to such an assumed market position as a result of any refusal of the trade request by traders 14. Additionally, any of the steps of such methods may be performed in any suitable order, or simultaneously or non-simultaneously, without departing from the scope of the invention.

The invention as disclosed allows a trader (such as a market maker or other trader) to efficiently populate a trading system with bids and offers in a risk efficient manner. Consider a market maker in the spot Euro vs. Dollar exchange rate. The trader may be comfortable with the risk profile associated with making a bid and an offer a price spread of 0.0002 apart in 10 million Euros worth (e.g. 1.2656 bid for 10 m, 1.2658 offered for 10 m). However, as an alternative, the trader may also be comfortable with the risk profile associated with making a bid and an offer a price spread of 0.0005 apart in 40 million Euros worth (e.g. 1.2654 bid for 40 m, 1.2659 offered for 40 m). In a slow moving market, the second 0.0005 price spread will likely be uncompetitive, but in a fast moving market the 0.0002 price spread will likely be too risky. The invention as disclosed allows for the market maker to supply prices according to both risk profiles. For example, the market maker may send a 0.0002 spread in 10 m and the disclosed system (namely, order distribution application 18) will place limit bids and offers behind that touch bid/offer price to provide the combined risk profile as desired.

For this example, suppose the market maker pre-configures the invention application to also give create a bid −0.0002 from their best touch price bid for 30 m, and create an offer +0.0002 from their touch price offer in 30 m. The market maker then sends the 1.2656/1.2658 price above in 10 m by 10 m to give the first risk profile. The disclosed system creates limit bid and offer prices according to the pre-configuration above to give a 1.2654 bid for 30 m and a 1.2660 offer for 30 m.

If other counterparties using the trading system sell Euros down to 1.2654 for a total of 40 m, as opposed to receiving a plurality of trades at each traded price, the market maker may preferably receive one single trade of 40 m Euros at a price of 1.26545 (the average of both trades). If other counterparties on a trading system buy Euros up to 1.2660 in a total of 40 m, the market maker may preferably receive one single trade of 40 m Euros at a price of 1.26595 (the average of both trades). The market maker thus makes a bid offer spread of both 0.002 in 10 m a side, and 0.0005 in 40 m a side, and rather than having to process two trades for each sell or buy in the above example, and update the market making computer's risk model multiple times, only one trade is matched. This may technically reduce the computing overhead in the market making system and allow for faster processing of trades to adjust risk parameters and pricing.

Although an embodiment of the invention and its advantages are described in detail, a person skilled in the art could make various alterations, additions, and omissions without departing from the spirit and scope of the present invention as defined by the appended claims.

What is claimed is:

1. A method, comprising:
  receiving, by at least one processor comprising a programmed electronic computer system, a plurality of sets of distribution parameters from at least one trader, in which the act of receiving the plurality of sets of distribution parameters comprises receiving a particular set of distribution parameters from a particular trader in communication with a trading exchange;
  after receiving the plurality of sets of distribution parameters, receiving from the particular trader a trading order for a particular instrument, the trading order comprising a trading order price and a trading order size, in which the trading order is received by the at least one processor;
  determining, by the at least one processor, from the plurality of sets of distribution parameters a particular set of distribution parameters for distributing the trading order across a plurality of price levels;
  based on the act of determining the particular set of distribution parameters for distributing the received trading order, automatically generating by the at least one processor a plurality of distributed trading orders distributed over multiple price levels based at least on the trading order price, the trading order size, and the identified particular set of distribution parameters, in which each of the plurality of distributed trading orders comprises a price and a size, in which the sum of the sizes of the plurality of trading orders is greater than or equal to the trading order size; and
  before any communicating of the trading order to the trading exchange, automatically submitting, by the at least one processor, the generated plurality of distributed trading orders to the trading exchange for the particular instrument, in which at least two of the plurality of distributed trading orders are available to each of a plurality of other traders on the trading exchange after the generated plurality of distributed trading orders are submitted to the trading exchange.

2. The method of claim 1, wherein the plurality of distributed trading orders are distributed over multiple price levels including the trading order price and one or more prices worse than the trading order price, in which the one or more prices worse than the trading order price comprises one of:
  (a) one or more bid prices that are lower than the trading order price, wherein the trading order comprises a bid, and the trading order price comprises a bid price that is at least as high as any of the prices associated with the individual trading orders, and
  (b) one or more offer prices that are higher than the trading order price, wherein the trading order comprises an offer, and the trading order price comprises an offer price that is at least as low as any of the prices associated with the individual trading orders.

3. The method of claim 1, wherein receiving the trading order comprises receiving by the at least one processor from the particular trader a trading order which can be executed by the trading exchange without receiving further confirmation from the particular trader.

4. The method of claim 1, wherein receiving the trading order comprises receiving by the at least one processor from the particular trader a trading order that can be executed by the trading exchange only after receiving further confirmation from the particular trader, wherein the particular trader is an automated price feed indicating the trading order price.

5. The method of claim 1, wherein:
  the particular set of distribution parameters defines, for each of the multiple price levels, price data for determining the price for a distributed trading order to be generated at that price level; and
  wherein generating by the at least one processor the plurality of distributed trading orders comprises:
    for each of the multiple price levels, determining by the at least one processor the price for a distributed trading order at that price level based on the trading order price and the price data for that price level; and for each of the multiple price levels, generating by the at least one processor a distributed trading order at the price determined for that price level;

the method further comprising:

matching a first one of the distributed trading orders with a counterorder from a first trader; and causing an execution of a trade between the particular trader and the first trader based on the act of matching the first one of the distributed trading orders with the counterorder from the first trader.

6. The method of claim 5, wherein the price data defines, for each of the multiple price levels, an amount of a price offset from the trading order price for a distributed trading order to be generated at that price level, further comprising:

matching a second one of the distributed trading orders with a counterorder from a second trader; and causing an execution of a trade between the particular trader and the second trader based on the act of matching the second one of the distributed trading orders with the counterorder from the second trader.

7. The method of claim 1, wherein:

the particular set of distribution parameters defines, for each of the multiple price levels, order size data for determining the size of a distributed trading order to be generated at that price level; and generating by the at least one processor the plurality of distributed trading orders comprises:

for each of the multiple price levels, determining by the at least one processor the size of a distributed trading order at that price level based on the trading order size and the order size data for that price level; and for each of the multiple price levels, generating by the at least one processor a distributed trading order of the size determined for that price level.

8. The method of claim 1, wherein:

receiving the trading order comprises receiving by the at least one processor data defining one or more order parameters regarding the trading order; and identifying the particular set of distribution parameters for processing the trading order comprises identifying by the at least one processor the particular set of distribution parameters based on the one or more order parameters.

9. The method of claim 8, wherein the order parameters regarding the trading order include an identification of the particular trader and an identification of the particular instrument.

10. The method of claim 1, wherein:

the plurality of sets of pre-configured distribution parameters includes multiple sets of distribution parameters corresponding to both the particular trader and the particular instrument, each of the multiple sets of distribution parameters corresponding to a different time zone;

the method further includes determining by the at least one processor a current time zone; and identifying by the at least one processor the particular set of distribution parameters for processing the trading order comprises identifying by the at least one processor the particular set of distribution parameters from the multiple sets of distribution parameters corresponding to both the particular trader and the particular instrument based at least on the determined current time zone.

11. The method of claim 1, further comprising:

modifying by the at least one processor one or more of the distribution parameters in the particular set of distribution parameters; and using by the at least one processor the modified one or more distribution parameters for generating at least one subsequent plurality of distributed trading orders for at least one subsequently received trading order.

12. The method of claim 1, further comprising:

receiving by the at least one processor from the particular trader, via a distribution parameter management interface, input for configuring one or more of the distribution parameters in the particular set of distribution parameters;

configuring by the at least one processor one or more of the distribution parameters in the particular set of distribution parameters based on the input received from the particular trader.

13. The method of claim 12, wherein:

the particular set of distribution parameters defines, for each of the multiple price levels, price data for determining the price for a distributed trading order to be generated at that price level; and receiving input from the particular trader for configuring one or more of the particular set of distribution parameters comprises receiving by the at least one processor input from the particular trader for configuring the price data for at least one of the multiple price levels.

14. The method of claim 12, wherein:

the particular set of distribution parameters defines, for each of the multiple price levels, price data for determining the price for a distributed trading order to be generated at that price level; and receiving input from the particular trader for configuring one or more of the particular set of distribution parameters comprises receiving by the at least one processor input from the particular trader for setting the number of multiple prices levels defined by the particular set of distribution parameters.

15. The method of claim 12, wherein:

the particular set of distribution parameters defines, for each of the multiple price levels, order size data for determining the size of a distributed trading order to be generated at that price level; and receiving input from the particular trader for configuring one or more of the distribution parameters in the particular set of distribution parameters comprises receiving by the at least one processor input from the particular trader for configuring the order size data for at least one of the multiple price levels.

16. The method of claim 12, wherein:

the particular set of distribution parameters defines total order size data for the plurality of distributed trading orders to be generated for a received trading order; and receiving input from the particular trader for configuring one or more of the particular set of distribution parameters comprises receiving by the at least one processor input from the particular trader for configuring the total order size data.

17. The method of claim 12, wherein:

the particular set of distribution parameters defines default settings and one or more trader-selected settings for distributed trading orders to be generated for a received trading order; and receiving input from the particular trader for configuring one or more of the particular set of distribution parameters comprises receiving by the at least one processor input from the particular trader for selecting between a default setting and one of the trader-selected settings for one or more particular parameters.

18. The method of claim 1, wherein:
the particular trader is a market maker;
the trading order comprises receiving a bid-offer price spread for the particular instrument; and
automatically generating a plurality of distributed trading orders comprises:
generating by the at least one processor multiple bid orders distributed over a first range of multiple price levels; and
generating by the at least one processor multiple offer orders distributed over a first range of multiple price levels.

19. The method of claim 18, wherein:
the bid-offer price spread includes a bid price and an offer price;
the first range of multiple price levels includes the bid price and one or more prices worse than the bid price, in which the bid price is greater than or equal to the one or more prices worse than the bid price; and
the second range of multiple price levels includes the offer price and one or more prices worse than the offer price, in which the offer price is less than or equal to the one or more prices worse than the offer price.

20. The method of claim 1, further comprising causing by the at least one processor each of the submitted distributed trading orders to be displayed to other traders in the market at at least one display device.

21. The method of claim 1, further comprising:
determining by the at least one processor a size for each of the plurality of distributed trading orders based at least on the identified set of distribution parameters;
receiving by the at least one processor one or more trade notifications indicating one or more trades between one or more particular ones of the plurality of distributed trading orders and one or more contra trading orders;
in response to receiving the one or more trade notifications, reducing by the at least one processor the size of each of the one or more particular ones of the plurality of distributed trading orders;
receiving by the at least one processor regeneration data regarding increasing the reduced size of the one or more particular distributed trading orders; and
increasing by the at least one processor the reduced size of at least one of the particular ones of the plurality of distributed trading orders.

22. The method of claim 21, further comprising refilling by the at least one processor the reduced size of at least two of the particular ones of the plurality of distributed trading orders in order beginning with the one of the at least two distributed trading orders at the worst price level.

23. The method of claim 21, further comprising communicating by the at least one processor an executed trade notification to the particular trader indicating information about the one or more trades between the one or more particular distributed trading orders and the one or more contra trading orders.

24. The method of claim 23, wherein:
the one or more trades include multiple trades between multiple particular distributed trading orders at multiple prices and one or more contra trading orders;
the method further comprising determining by the at least one processor an average trade price for the multiple trades based at least on the price and size of each of the traded multiple particular distributed trading orders; and
the executed trade notification communicated to the particular trader indicates the average trade price.

25. The method of claim 24, wherein a single executed trade notification is communicated to the particular trader for the multiple trades.

26. A method, comprising:
maintaining, by at least one processor comprising a programmed electronic computer system, a set of distribution parameters for automatically generating, for a trading order for a particular instrument received from a trader in electronic communication with a trading exchange, a plurality of trading orders distributed across a plurality of price levels to be placed on a trading exchange in electronic communication with the at least one processor;
providing the trader an interface for configuring at least a portion of the distribution parameters, in which the interface is provided by the at least one processor;
receiving from the trader a request to modify at least a portion of the distribution parameters, in which the request is received by the at least one processor;
in response to the request received from the trader, modifying by the at least one processor the set of distribution parameters, including modifying one or more particular distribution parameters;
receiving by the at least one processor a particular trading order for the particular instrument from the trader, the particular trading order being defined by one or more trading order parameters;
before any communicating of the trading order to the trading exchange, automatically generating by the at least one processor a plurality of distributed trading orders distributed across a plurality of price levels based at least on the one or more trading order parameters and the set of distribution parameters including the modified one or more particular distribution parameters, in which each of the plurality of distributed trading orders comprises a price and a size, in which the sum of the sizes of the plurality of trading orders is greater than or equal to a size of the particular trading order; and
before any communicating of the trading order to the trading exchange, automatically submitting by the at least one processor the generated plurality of distributed trading orders to the trading exchange so that at least two of the plurality of distributed trading orders are available to each of a plurality of traders via the trading exchange.

27. The method of claim 26, wherein:
the distribution parameters define price data and size data for determining the price and size for each of the distributed trading orders to be generated for the trading order; and
automatically generating a plurality of distributed trading orders based at least on the trading order parameters and the set of distribution parameters including the modified one or more particular distribution parameters includes determining by the at least one processor a price and size for each of the distributed trading orders based at least on the distribution parameters.

28. The method of claim 26, wherein automatically generating a plurality of distributed trading orders comprises automatically generating by the at least one processor a plurality of distributed trading orders over multiple price levels.

29. The method of claim 28, wherein:
the particular trading order has an associated price; and
the plurality of distributed trading orders are distributed over multiple price levels including the trading order price and one or more prices worse than the trading order price, in which the one or more prices worse than the trading order price comprises one of:

(a) one or more bid prices that are lower than the trading order price, wherein the trading order comprises a bid, and the trading order price comprises a bid price that is at least as high as any of the prices associated with the individual trading orders, and (b) one or more offer prices that are higher than the trading order price, wherein the trading order comprises an offer, and the trading order price comprises an offer price that is at least as low as any of the prices associated with the individual trading orders.

30. A system, comprising:

a trading platform comprising a processor that manages a trading exchange; and an order distribution application comprising a processor communicatively coupled to the trading platform that performs the following actions:

receive a plurality of sets of distribution parameters from at least one trader, in which the act of receiving the plurality of sets of distribution parameters comprises receiving a particular set of distribution parameters from a particular trader in communication with at least one trading exchange;

after the act of receiving the plurality of sets of distribution parameters, receive from a particular trader a trading order for a particular instrument, the trading order comprising a trading order price and a trading order size;

identify from the plurality of sets of distribution parameters a particular set of distribution parameters for distributing the trading order;

based on the act of identifying the particular set of distribution parameters for distributing the received trading order and before any communicating of the trading order to any other traders, automatically generate a plurality of distributed trading orders distributed over multiple price levels based at least on the trading order price, the trading order size, and the identified set of distribution parameters, in which each of the plurality of distributed trading orders comprises a price and a size, in which the sum of the sizes of the plurality of trading orders is greater than or equal to the trading order size; and automatically submit the generated plurality of distributed trading orders to the at least one trading exchange before any submitting of the trading order to the at least one exchange.

31. The system of claim 30, wherein the order distribution application is operable to generate a plurality of distributed trading orders distributed over multiple price levels including the trading order price and one or more prices worse than the trading order price, in which the one or more prices worse than the trading order price comprises one of:

(a) one or more bid prices that are lower than the trading order price, wherein the trading order comprises a bid, and the trading order price comprises a bid price that is at least as high as any of the prices associated with the individual trading orders, and (b) one or more offer prices that are higher than the trading order price, wherein the trading order comprises an offer, and the trading order price comprises an offer price that is at least as low as any of the prices associated with the individual trading orders.

32. The system of claim 30, in which the plurality of distributed trading orders comprises at least:

a first trading order comprising (i) a first price and (ii) a first size, and a second trading order comprising (i) a second price different from the first price and (ii) a second size different from the first size.

33. The system of claim 30, in which the sum of the sizes of the individual trading orders is greater than the trading order size.

34. The system of claim 30, in which the sum of all of the sizes of the individual trading orders is equal to the trading order size.

35. An apparatus comprising:

at least one processor; and a memory that stores instructions which, when executed by the at least one processor, directs the at least one processor to:

receive from a particular trader a trading order for a particular instrument, the trading order comprising a trading order price and a trading order size for a particular instrument;

determine from a plurality of sets of pre-configured distribution parameters a particular set of distribution parameters for processing the trading order, the particular set of distribution parameters comprising a plurality of parameter pairs, each parameter pair comprising a price parameter and a size parameter;

after determining the particular set of distribution parameters, generating a plurality of distributed trading orders for the particular instrument based on the trading order price, the trading order size, and the particular set of distribution parameters, in which the number of distributed trading orders in the plurality of distributed trading orders is equal to the number of parameter pairs in the plurality of parameter pairs, in which the act of generating a plurality of distributed trading orders comprises generating a distributed order for each parameter pair, in which the act of generating a distributed order for each parameter pair comprises:

determining a price of the distributed order based on the trading order price and the price parameter of the parameter pair;

determining a size of the distributed order based on the trading order size and the size parameter of the parameter pair;

before any submitting of the trading order to the at least one trading exchange, submitting the generated plurality of distributed trading orders to at least one trading exchange for the particular instrument.

36. The apparatus of claim 35, in which each size parameter comprises a specific size for a distributed order, and in which each price parameter comprises one of (i) a distributed order price and (ii) a distributed order price adjustment amount for a distributed order, in which the act of determining a size of each distributed order comprises setting the size equal to the specific size of the corresponding size parameter, in which the act of determining a price of each distributed order comprises one of (i) setting the price equal to the distributed order price of the corresponding price parameter and (ii) incrementing the trade order price by the distributed order price adjustment amount of the corresponding price parameter, and in which the act of generating a plurality of distributed trading orders comprises generating a plurality of distributed trading orders distributed over multiple price levels including the trading order price and one or more prices worse than the trading order price, in which the one or more prices worse than the trading order price comprises one of:
- (a) one or more bid prices that are lower than the trading order price, wherein the trading order comprises a bid, and the trading order price comprises a bid price that is at least as high as any of the prices of the distributed trading orders, and
- (b) one or more offer prices that are higher than the trading order price, wherein the trading order comprises an offer, and the trading order price comprises an offer price that is at least as low as any of the prices of the distributed trading orders.

37. The apparatus of claim 36, in which the sum of the sizes of the each of the plurality of distributed trading orders is equal to the trading order size, further comprising:
  causing a plurality of the distributed trading orders to be executed.

38. The apparatus of claim 36, in which the sum of the sizes of the each of the plurality of distributed trading orders is greater than the trading order size.

39. An apparatus comprising:
  a non-transitory machine readable medium having stored thereon a plurality of instructions that, when executed by at least one computing device, cause the at least one computing device to perform a method comprising:
    receiving a plurality of sets of distribution parameters from at least one trader, in which the act of receiving the plurality of sets of distribution parameters comprises receiving a particular set of distribution parameters from a particular trader in communication with a trading exchange;
    after receiving the plurality of sets of distribution parameters, receiving from the particular trader a trading order for a particular instrument, the trading order comprising a trading order price and a trading order size, in which the trading order is received by the at least one processor;
    determining from the plurality of sets of distribution parameters a particular set of distribution parameters for distributing the trading order across a plurality of price levels;
    based on the act of determining the particular set of distribution parameters for distributing the received trading order, automatically generating a plurality of distributed trading orders distributed over multiple price levels based at least on the trading order price, the trading order size, and the identified particular set of distribution parameters, in which each of the plurality of distributed trading orders comprises a price and a size, in which the sum of the sizes of the plurality of trading orders is greater than or equal to the trading order size; and
    before any communicating of the trading order to the trading exchange, automatically submitting the generated plurality of distributed trading orders to the trading exchange for the particular instrument, in which at least two of the plurality of distributed trading orders are available to each of a plurality of other traders on the trading exchange after the generated plurality of distributed trading orders are submitted to the trading exchange, in which the plurality of distributed trading orders each comprise an order from the particular trader.

* * * * *